United States Patent [19]
Watkins et al.

[11] 4,015,972
[45] Apr. 5, 1977

[54] FORTIFIED GYPSUM GRANULE

[75] Inventors: Kenneth Ray Watkins, Wheaton; Robert John Wenk, Arlington Heights, both of Ill.

[73] Assignee: United States Gypsum Company, Chicago, Ill.

[22] Filed: Aug. 13, 1975

[21] Appl. No.: 604,366

[52] U.S. Cl. .................... 71/31; 71/63; 71/64 DC; 423/517; 106/109

[51] Int. Cl.² .......................... C05D 3/02

[58] Field of Search ......... 71/31, 63, 64 A, 64 DC; 423/166, 517, 544, 548; 106/109, 110

[56] References Cited
UNITED STATES PATENTS

| | | | |
|---|---|---|---|
| 499,710 | 6/1893 | Bronson | 106/110 |
| 780,240 | 1/1905 | Spitzer | 106/110 |
| 1,470,260 | 10/1923 | Emerson | 106/110 |
| 3,809,566 | 5/1974 | Revord | 106/110 |
| 3,820,970 | 6/1974 | Watkins | 71/63 X |
| 3,860,409 | 1/1975 | Wilson | 71/63 X |

FOREIGN PATENTS OR APPLICATIONS 413,208  8/1968  Australia

*Primary Examiner*—Frank A. Spear, Jr.
*Assistant Examiner*—Ferris H. Lander
*Attorney, Agent, or Firm*—Kenneth E. Roberts; Samuel Kurlandsky; Robert H. Robinson

[57] ABSTRACT

A sulfur fortified gypsum granule is provided, preferably adapted for agricultural uses so as to give a timed release of sulfate nutrients in soil comprising a combination of at least about 5 percent by weight of elemental sulfur and a major proportion of calcium sulfate which combination has been roll pressure compacted at a mixture temperature of about 110°–230° F to form hard granular shapes.

10 Claims, 1 Drawing Figure

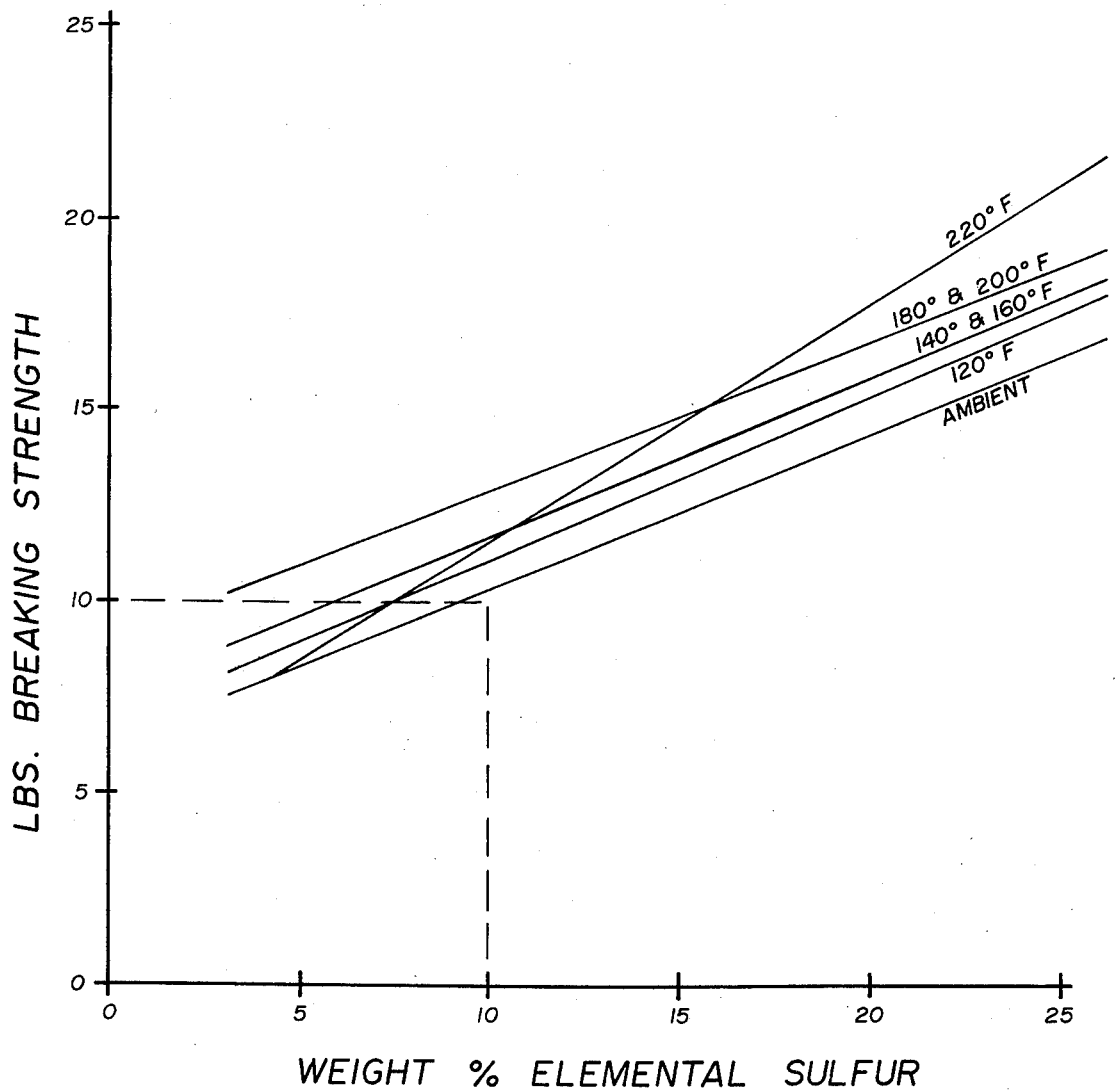

FORTIFIED GYPSUM GRANULE

BACKGROUND OF THE INVENTION

1. Field of the Invention

This invention concerns improvements in compaction formed agricultural granules containing calcium sulfate (gypsum) adapted for use on soil to provide nutrients to plants and as a carrier for fertilizers, pesticides and the like. More particularly, this invention is concerned with improving such compositions by providing them with controlled availability to plants of sulfate nutrient and by providing them in a form that is hard and scarcely dusting in a sulfate-fortified agricultural granular product. Further this invention relates to novel compositions; and more particularly to novel compositions which supply sulfate as a plant nutrient and soil amendment in a controlled, time-release fashion.

As is well known in the art, pelletilization is an agglomeration process in which powdered and liquid materials are rolled around a disk or drum surface without pressure and allowed to agglomerate by mere physical attraction and gravitational forces. In contrast thereto, pressure roll compaction as set forth in U.S. Pat. No. 3,820,970 to Watkins is an agglomeration process wherein powdery material is compacted under pressure into a sheet which is then flaked into chunks and then crushed and screened into desired size of particles. While in the agricultural industry drum and disk pelletizers and pelletizing methods are sometimes referred to as granulators and granulation; herein the terms pellets, pelletizing and pelletizor will be used to describe non-pressure agglomeration while the phrase granule and granulator will be used with reference to pressure compaction agglomeration techniques and products.

Sulfur is one of the many elements essential for plant growth. It is a macronutrient, like nitrogen, phosphorus, potassium, calcium and magnesium; and must be available in relatively large amounts for good crop growth. Sulfur is also useful as a fungicide and insecticide. At one time sulfur was a common component of many low analysis fertilizers. Such fertilizers satisfied most needs for sulfur fertilization of agricultural crops. If and when additional sulfur was needed, powdered gypsum (land plaster or calcium sulfate dihydrate) was commonly used. However the development of newer, high analysis for the other macronutrient, fertilizers has resulted in the more frequent and extensive reporting of sulfur deficiency in soils throughout the world. In addition, increased crop yields, double cropping in many areas, and the greater emphasis on control of air pollution and consequent utilization of low sulfur fuels thus reducing atmospheric sources of plant nutrient sulfur have aided and abetted increasing sulfur deficiencies. Thus it has become important to provide sulfur application to soils.

Elemental sulfur itself is, of course, the most concentrated sulfur carrier for treatment of soils. However elemental sulfur is a form not readily and immediately utilizable by plants. Generally, before most plants can utilize elemental sulfur it must first be converted to a sulfate form ($SO_4$) in the presence of soil microorganisms. In many cases, thus, application of the elemental sulfur must be made more than one growing season ahead of the time when it is needed and will be available for utilization by the plants. Since sulfur deficiency is steadily increasing particularly in areas of double cropping and in connection with increased crop yields, this at times is of benefit rather than disadvantage. However, from the farmer's point of view, the most economic and convenient method of applying needed plant nutrient sulfur is likely to be in connection with his fertilizer treatment for a current growing season.

2. Description of the Prior Art

The most straightforward manner for applying the most concentrated sulfur to soils is by the application of elemental sulfur. Since elemental sulfur is generally applied as a dust, it is subject to being blown away in the winds or washed away by flowing surface water or soak into the ground below the plant roots. In these cases it never becomes available to the plants. Further, since it must convert to the sulfate form before becoming available to the plants for utilization, application of elemental sulfur powder may provide sulfate availability for plant utilization at an unpredictable time after application to the soil. This frequently results in the necessity to refertilize the plants in order to maintain plant growth.

One method of reducing the time delay after application of sulfur before it can be utilized by the growing plants is to provide it in a sulfate form. Thus it has been a long standing practice on certain soils for certain plants to apply finely particulate gypsum; which treatment is commonly referred to by those in the industry as "land plastering". As a powder form of application, there may be mentioned U.S. Pat. No. 3,846,116 which teaches the application of calcium-containing compounds, such as calcium sulfate, in finely divided powder form, more particularly of having a size of about 20 microns or less and preferably of sub-micron size in the treatment of peanut plant foilage to prevent the formation of "pops" and unsound kernals. That patent mentioned that as a physical admixture of powders there might also be included sulfur along with the calcium-containing compound in a dust or powder of the requisite particle size. This is a physical admixture in the form of a dust or powder of the requisite small particle size. Again, since the form being applied is a powder it is subject to erosive forces, as well as the inconvenience of enveloping the applicator in a "cloud of dust." Further, such treatment must be at the appropriate time coincident with the individual plant's needs in the growing seasons. In addition powder forms are difficult to handle by the farmer's typical fertilizing equipment.

There have been a number of attempts to incorporate elemental sulfur into more intimate admixture of macronutrients to be provided in fertilizer-sized agglomerated form. Principally these have been concerned with forming a solvent solution of the elemental sulfur, along with other substrates, and using these as coating around the fertilizer nutrients. Such practices are exemplified by U.S. Pat. Nos. 3,295,950; 3,342,577; 3,576,613; 3,580,715. In addition to these, U.S. Pat. No. 3,799,884 discloses a soil application sizes of elemental sulfur produced by aqueous dispersion grinding of a "porous particulate sulfur." Further, U.S. Pat. No. 2,416,663 teaches the production of a pellet fertilizer composed of a by-product of molten sulfur extraction from phosphate gange material in pelletized fertilizer form.

More recently U.S. Pat. No. 3,820,970 discloses a method of compaction granulation of calcium sulfate utilizing stucco as a binder to provide gypsum is a hard, less dusty granular form more convenient for application to the soil. It is apparent from this patent that if gypsum particles are pressure compacted without such a binder, the particles will not hold together but will disintegrate in handling causing "dusting". That is, when ground gypsum is subjected to pressure, in attempts to compact it into a sheet and then break the sheet up into granules, the particular characteristics of the calcium sulfate material are such that an inordinate amount of fine, powdering dusts and irregular-sized particles result unless suitable binders or equivalent are included.

SUMMARY OF THE INVENTION

It is therefore one object and advantage of the present invention to provide gypsum products in granular form, which granules are scarcely dusty in comparison to prior gypsum products without the use of a binder and which granules do not require previously required known binding agents.

Another object is the provision of granular gypsum products which are scarcely dusty and which are fertilizer-sized and which are adapted from agricultural use to provide a controlled, timed release of sulfate nutrients.

Another object is the provision of granular gypsum based products containing optional ingredients and which may be used as fertilizers, plant nutritional supplements, soil aids, pesticides, pharmaceuticals and the like.

Still another object is the provision of granular gypsum products by roll pressure compaction means without the use of the heretofore required chemical binding agents.

In pursuing avenues to increase total sulfur level in granular gypsum products by pressure roll compaction-granulation, it was surprisingly found that increased hardness and much less dustiness resulted when certain amounts of elemental sulfur were included at certain temperatures in the formulation, apparently due to a plasticity effect of this amorphous material coupled with the frictional temperature increases generated by the pressure-roll compaction technique. Further a supplementary lubricating, plasticating and binding auxiliary effects resulted that allowed the compaction of gypsum materials to be achieved without the heretofore required inclusion of a binder or binding-aid material. Thus, the fulfillment of the above and other objects and advantages of the present invention are accomplished, in one highly preferred embodiment for the production of a scarcely dusty granular agricultural gypsum nutrient supplement material, by the steps of admixing gypsum as a major ingredient with, by weight, at least about on the order of 5% by weight of elemental sulfur to form a substantially dry solid mixture; compacting the dry mixture between two rolls, at such roll speed and pressure (and any such optional roller heat) as to produce a temperature within the mixture on the order of about 100°–225° F, into a sheet of compacted materials; and crushing and screening the compacted material to desired granule size, i.e. conveniently about 6 by 16 U.S. Standard mesh as for commerical fertilizer granules. By operation in this manner, it is possible to completely eliminate the addition of any liquids such as water to provide binding or bonding action between the powder particles forming the granule and to eliminate binding-aid materials such as calcium sulfate hemihydrate necessary to augment the bonding action of the water.

BRIEF DESCRIPTION OF THE DRAWINGS

The invention will be more readily understood by reference to the ensuing description of the preferred embodiments and by reference to the accompanying drawings in which the FIGURE represents in graphic form the effects of elemental sulfur addition on strength of gypsum buttons formed at various temperatures.

DETAILED DESCRIPTION OF THE PREFERRED EMBODIMENTS

The principal ingredient of the granule is calcium sulfate and may be dihydrate or anhydrite or mixtures thereof, such as found in the common industrial mineral known as gypsum. Calcium sulfates derived from various sources including so-called synthetic or by-product gypsum may be used as well as the natural mineral materials. The gypsum in the form of dihydrate will generally be the major ingredient in most of the embodiments of the product of the present invention, although the quantity may be as little as about 15% or less. Generally, when the final product is to be put to such end uses as a timed-release sulfate fertilizer aid or combined with one or more primary fertilizer nutrients as a more complete fertilizer the gypsum will be present in amounts in the general range of about 90% to 50%, although this is highly variable and amounts above and below this quantity can be used but without substantial further advantage. Generally, when the final product is to be put to such end uses as a carrier for pesticidally-active components or a soil conditioner and the like, the gypsum will be present in higher amounts, as for example up to about 94% of the granule by weight.

The elemental sulfur is that commonly available from many sources, and may be naturally occurring sulfur or that recovered from various chemical processes. The elemental sulfur should be present in amounts of at least on the order of about 5% by weight to provide effective plasticating action in the formation of granules according to the present invention. To provide effective time-released sulfur fortified gypsum granule for agricultural useages, the amounts of sulfur addition will be highly variable above this minimum point; the particular amount depending upon the amount of sulfate that is desired to be made available in the soil at a later time due to microogunism action on the elemental sulfur and due to particular plant and soil requirements. Generally, it is preferred for time-release of sulfate nutrients in agricultural products that the elemental sulfur be present in the formulation in amounts of 10 to 40% by weight of the composition; and about 10–18% is particularly preferred for an about 1:1 ratio of sulfate to sulfur content preferably desired for most applications. It should be noted in this connection that with increasing amounts of elemental sulfur in pulverulent form being added to powdered ingredients that, as the amount thereof increases, appropriate varying degrees of dust explosion venting and other standard practices should be taken with this material. In addition, it appears that the resultant strength increases from the plasticating effect of pressure compacted materials that contain elemental sulfur increases directly with each of increasing quantities of elemental sulfur and increasing temperatures of the admixture undergoing compression compaction within the range of ambient to about 230° F. This is generally illustrated in the FIGURE and will be discussed in more detail hereinafter.

According to the invention, the process steps of pressure-roll compaction granulation of these materials is accomplished basically as set forth in U.S. Pat. No. 3,820,970. In the practice of the present invention, however, the internal temperature of the admixture of elemental sulfur and gypsum is important to control. It has been found that an internal admixture temperature of about 100°–230° F should be maintained for most economical levels of elemental sulfur to provide proper plasticating effectiveness of the elemental sulfur on the gypsum powder. Substantially below these temperatures higher levels of the elemental sulfur are required to compensate for the lack of sufficient plastic flow needed to provide the necessary lubricity and plasticating effect to flow between and around the gypsum powder particles. Substantially above these temperatures the elemental sulfur begins to approach the stage of incipient fusion and tends to become molten which is highly detrimental to the product in that it tends to coat the granule rather than interacting into and between the powder particles to form a homogenous mass within the granule; tends to begin chemical decomposition of the gypsum powder particles; and begins to drive off water of crystallization of any calcium sulfate dihydrate present which case result in a sticky and/or encapsulated, hard to handle and altered chemical composition granule. Any particular temperature may be readily accomplished by controlling the variable of roller speed and pressure and the optical use of supplying auxiliary mechanical heat to the rollers. Of course, any varying combination of increasing roller speed, increasing roller pressure, and increasing the temperature of heated rolls will provide any desired level of increased temperature to the internal admixture of the compacting elemental sulfur and gypsum.

The following examples are presented for the purpose of further illustrating and more particularly disclosing the present invention, and are by way of illustration and not in limitation thereon.

EXAMPLE 1

A convenient and meaningful simulated evaluation of different formulations for hardness of agglomerated material is to form them into buttons of fixed dimension and then subject them to a measurement of breaking strength on a Tinius Olson Stress Strain machine. In this evaluation, buttons were formed by adding a weighted quantity of the formulation to a steel cylinder with matching plunger measuring 1.50 inch in diameter. Pressure is gradually applied upon the formulation until 15,000 p.s.i. is attained and then the pressure is rapidly released to result in a button, or disk, having an about 1.5 inch diameter and 0.25 inch thickness. For comparison, the pressure for producing the buttons by this method is approximately 10 times that of the preferred compactor roll pressure in actual useage. The buttons were then allowed to cool and tested in the Tinius Olson machine. For evaluation in the Tinius Olson machine, the individual buttons are centered on the top end of a 2-inch steel cylinder having an outside diameter of 1.59 inch and wall thickness of 0.14 inch. A plunger is attached to the pressure arm of the machine and carefully centered over the button's center; and then pressure applied to the button. The pressure is increased in standard increments until the button ruptures, and the pounds of pressure reading on the machine scale is recorded.

To simulate interior mixture temperatures of formulations during compaction subjected to varying roll speeds and pressures, the formulations for forming into buttons and the button forming apparatus were placed in an oven at a set temperature for one half hour and allowed to heat up to the set temperature. After that time of heating, the formulations and button forming apparatus were removed from the oven and immediately buttons were formed to simulate the conditions in the roll compaction unit at speeds and pressures duplicating the temperature settings of the oven.

Representative evaluations of calcium sulfate alone and calcium sulfate plus varying amounts of elemental sulfur formed into buttons at varying temperatures are set forth in Table 1.

TABLE 1

| FORMULATION | TEMPERATURE | TINIUS OLSON STRENGTH (LBS.) |
|---|---|---|
| Gypsum alone | Ambient | 7.9 |
| " | 120° | 7.7 |
| " | 140° | 8.0 |
| " | 160° | 6.9 |
| " | 180° | 6.4 |
| " | 200° | 7.5 |
| " | 220° | 7.5 |
| Gypsum + 5% Elemental Sulfur | Ambient | 8.7 |
| " | 120° | 9.7 |
| " | 140° | 10.7 |
| " | 160° | 9.8 |
| " | 180° | 10.3 |
| " | 200° | 11.2 |
| " | 220° | 10.7 |
| Gypsum + 10% Elemental Sulfur | Ambient | 9.5 |
| " | 120° | 10.2 |
| " | 140° | 12.0 |
| " | 160° | 12.2 |
| " | 180° | 12.9 |
| " | 200° | 12.2 |
| " | 220° | 10.2 |
| Gypsum + 15% Elemental Sulfur | Ambient | 13.2 |
| " | 120° | 12.7 |
| " | 140° | 12.7 |
| " | 160° | 14.0 |
| " | 180° | 15.2 |
| " | 200° | 17.2 |
| " | 220° | 14.8 |
| Gypsum + 20% Elemental Sulfur | Ambient | 13.7 |
| " | 120° | 16.0 |
| " | 140° | 14.9 |
| " | 160° | 15.6 |
| " | 180° | 17.3 |
| " | 200° | 16.1 |
| " | 220° | 17.9 |

The Tinius Olson strength figures set forth in Table 1 represent the average breaking strength for duplicate replications of each formulation being evaluated. Looking at the results set forth in Table 1, it can be seen that generally the strength at which the buttons broke increased both with increased amounts of elemental sulfur addition and with increased formation temperature of the buttons. The data for a given temperature was plotted in graphic form for increasing amounts of elemental sulfur and was found to consistently provide increasing strengths with increasing amounts of elemental sulfur. The plotted data was then averaged to a straight line function and the lines obtained for the various temperatures are set forth in the FIGURE. As a practical matter buttons should have a breaking strength of at least 10 lbs. to perform satisfactorily in producing granules in a roll compaction apparatus. From the FIGURE it can be clearly seen that this strength is obtained at ambient temperature with 10% or more elemental sulfur addition and readily obtained at 5% or more elemental sulfur addition at the more elevated temperatures. Of course increasing the quantity of elemental sulfur addition, of the formulation temperature, or both as seen from the FIGURE provides increased breaking strength.

It might be mentioned that in other evaluations at ambient temperature at other times the breaking strength of buttons containing gypsum alone without adjuvants tended to be closer to the 10 lbs. strength level; however consistently for this series of evaluations on breaking strength the gypsum alone formulations were around 7-8 lbs. This higher value is considered generally accounted for by slight variations and trace amounts of free moisture contained in the land plaster as received. The results of the control formulation of gypsum alone at varying temperature is not set out on the FIGURE, but if one were to let the increasing temperature be the abscissa of the graph, one would obtain a straight horizontal line at about the 8 lbs. breaking strength ordinate.

EXAMPLE 2

In another evaluation, a 20 ton run was made in a roll compaction apparatus to result in 6 × 16 U.S. Standard mesh granular product containing 17% elemental sulfur compacted at an internal mixture temperature of about 160° F. The powdered materials were blended by alternately dumping seven 100 lb. bags of powdered land plaster and three 50 lb. bags of elemental sulfur into a thousand lb. capacity open mixer and allowing them to physically blend for approximately 5 minutes per 850 lb. batch and then airveying the mixture into the hopper of a Chilsonator compactor and granulator apparatus. The compactor roll speed and pressure controls were adjusted to provide an about 160°-170° F internal mixture temperature of materials at the nip of the rolls, and the powdered material passed through the rolls to form a compacted sheet. The compacted sheet was very solid throughout and had a highly glazed surface lacking imperfections, such as laminations and surface striations characteristic of materials which would result in less dense and less hard granules. The sheet was passed through the flake-breaker, granulator and then screened so as to separate over-sized granules and under-sized granules or fines from the desired 6 and 16 mesh agglomerates.

Aliquots of the material from this run and of a comparison run of a granular gypsum product comprising land plaster, stucco and water according to U.S. Pat. No. 3,820,970 were evaluated by screening for dusting and another type of hardness test. In this second hardness evaluation, the test sample aliquots are screened through 6 mesh, 8 mesh, 12 mesh, 18 mesh, 30 mesh and 60 mesh U.S. Standard sieves to provide portions of the specific mesh sizes; and equal amounts of the separate portions are recombined to provide a composite sample having a uniform particle size distribution by weight. 30 gram portions of the recombined composite samples are placed into the pan of a Ro-Tap sieve shaker along with ten steel balls of 5/8th inch diameter, and the sample is allowed to shake for 5 minutes without hammer action. Then the sample is placed into an 18 mesh seive, replaced on the shaker, and given 2 minutes shaking with hammer action. Thereafter the material retained on the 18 mesh sieve is removed from the shaker and weighted to the nearest 0.1 gram for a calculation of Resistance to Attrition by the following calcultion:

$$RTA \% = \frac{\text{weight retained on 18 mesh sieve}}{30 \text{ grams}} \times 100$$

Exemplary results of random sample screening between 6 and 16 mesh and of Resistance to Attrition for the large scale run of a product of the present invention containing gypsum fortified with 17% elemental sulfur compared to a typical run according to U.S. Pat. No. 3,820,970 which contained about 20% hemihydrate is set forth in Table 2.

TABLE 2

| ELEMENTAL SULFUR GYPSUM GRANULES: | |
| --- | --- |
| Normal Screening Analysis | |
| Retained (between 6 and mesh) | 97% |
| Fines (total amount passing 16 mesh including dusts) | 2.8% |
| Dusts (passing 60 mesh) | 0.6% |
| Resistance To Attrition | 73% |
| HEMIHYDRATE - GYPSUM GRANULES: | |
| Normal Screening Analysis | |
| Retained | 87.5% |
| Fines | 9% |
| Dusts | 4% |
| Resistance To Attrition | 65% |

From Table 2 it can be seen that the composition of the present invention provided much better resistance to attrition than did the typical calcium sulfate hemihydrategypsum granules. Further the composition of the present invention was greatly improved with regard to the amounts of fines and dusts generated in a typical large scale run, from which it would be expected that much less dusting and undersized particles would result during normal storage, handling and bagging of the materials.

Optionally for plant nutrient granules, in addition to other macronutrients such as primary plant nutrients (sources of nitrogen, phosphorous and potassium) or secondary plant nutrients (such as magnesium and sulfur), micronutrients (such as copper, zinc, boron, iron, manganese, molybdenum and the like) may be incorporated in similar fashion to supply further additional plant nutrient values to the soil. In general, the percentages of nutrient addition will be dictated by soil analysis and particular plant crop needs as well as the amount of nutrient element in the chemical compound being added; and thus may vary widely. For example, in general the percentages of micronutrient addition will vary between about 0.005 and 10% by weight. In accordance with the model fertilizer law, micronutrient additions should meet the following individual quantities: boron, 0.02%; chlorine, 0.10%; copper, 0.05%; iron, 0.10%; manganese, 0.05%; molybdenum, 0.0005%; and zinc, 0.05%. The amount of such micronutrient elements would range also widely depending on the type of compound by which they are being added, for example there is about 14-15% boron in sodium tetraborate; about 47-48% chlorine in potassium chloride; about 75-90% copper in cuprous oxides; about 40-50% iron in ferric or ferrous carbonates; about 23-28% manganese in manganese sulfate; about 39% molybdenum is sodium molybdate; and about 57-58% zinc in zinc oxide. The granule of the invention is compatible with a great variety of biocides and pesticides;

and such materials may be incorporated, preferably in dry form, with the feed materials in customary quantities for their usual and known customary effects. Various veterinary and animal feed products may be formed on the granules. When a "food grade" gypsum is used in the granules, the resultant granule may be used as a carrier base material for a variety of pharmaceutical applications.

While the present invention has been described and exemplified with respect to certain embodiments, it is not to be considered limited thereto; and it is understood that variations and modifications thereof, obvious to those skilled in the art, may be made without departing from the spirit or scope of this invention.

What is claimed is:

1. A hard, scarcely dusting gypsum granule composition consisting essentially of a combination of at least about 5% by weight of elemental sulfur and a major proportion of calcium sulfate, said granule having a resistance to attrition on the order of at least about 70.

2. The gypsum granule of claim 1 including about 60% by weight of calcium sulfate dihydrate.

3. The gypsum granule of claim 1 adapted for use on soil to provide separate timed availability to plants of sulfate nutrients, including about 17% elemental sulfur and about 80% calcium sulfate dihydrate; and said granule having been pressure compacted at a mixture temperature of about 100°–230° F.

4. A hard scarcely dusting agricultural granule adapted for use on soil to provide separate timed availability to plants of sulfate nutrients consisting essentially of on the order of at least about 5% by weight of elemental sulfur and on the order of at least about 50% by weight calcium sulfate.

5. A method of producing a hard, scarcely dusting gypsum product comprising:
   forming a mixture of calcium sulfate and elemental sulfur;
   plasticating the sulfur by roll pressure compaction at such roll speed and pressure as to produce a temperature within the mixture on the order of about 100°–230° F;
   compacting the mixture into a sheet; and crushing the sheet to desired granule size.

6. The process of claim 5 wherein the mixture formed is substantially dry, and contains at least about 5% by weight of elemental sulfur and at least about 50% calcium sulfate.

7. The process of claim 1 wherein the mixture is compacted between two rolls, at such roll speed and such roll pressure as to obtain a temperature in the mixture on the order of 160°–220° F.

8. The process of claim 7 wherein the rolls are heated.

9. The process of claim 5 including the additional steps of crushing and screening the granules to about 6 × 16 mesh.

10. The process of claim 5 in which the calcium sulfate is calcium sulfate dihydrate.

* * * * *